United States Patent
Seo et al.

(10) Patent No.: US 10,364,380 B2
(45) Date of Patent: Jul. 30, 2019

(54) ADHESIVE COMPOSITION FOR OPTICAL USE, METHOD FOR PREPARING ADHESIVE COMPOSITION FOR OPTICAL USE, AND ADHESIVE FILM FOR OPTICAL USE

(71) Applicant: LG Chem, Ltd., Seoul (KR)

(72) Inventors: Kwang Su Seo, Daejeon (KR); Eun Kyung Park, Daejeon (KR); Seung Won Lee, Daejeon (KR); Jang Soon Kim, Daejeon (KR); Won Gu Choi, Daejeon (KR); Tae Yi Choi, Daejeon (KR)

(73) Assignee: LG Chem, Ltd. (KR)

( * ) Notice: Subject to any disclaimer, the term of this patent is extended or adjusted under 35 U.S.C. 154(b) by 15 days.

(21) Appl. No.: 15/528,914

(22) PCT Filed: Nov. 4, 2016

(86) PCT No.: PCT/KR2016/012705
§ 371 (c)(1),
(2) Date: May 23, 2017

(87) PCT Pub. No.: WO2017/078487
PCT Pub. Date: May 11, 2017

(65) Prior Publication Data
US 2017/0313917 A1    Nov. 2, 2017

(30) Foreign Application Priority Data
Nov. 5, 2015  (KR) ........................ 10-2015-0155168

(51) Int. Cl.
*C09J 11/06* (2006.01)
*C09J 151/06* (2006.01)
*C09J 123/22* (2006.01)

(52) U.S. Cl.
CPC ............. *C09J 151/06* (2013.01); *C09J 11/06* (2013.01); *C09J 123/22* (2013.01); *C09J 2423/00* (2013.01)

(58) Field of Classification Search
CPC ........ C09J 11/06; C09J 123/22; C09J 123/26; C09J 151/06; C09J 2451/00; C09J 2423/00; C08F 255/08; C08F 255/00; C08F 279/02
See application file for complete search history.

(56) References Cited

U.S. PATENT DOCUMENTS

| | | |
|---|---|---|
| 2002/0132925 A1 | 9/2002 | Cernohous et al. |
| 2014/0231009 A1 | 8/2014 | Chitnavis et al. |
| 2016/0200948 A1 | 7/2016 | Choi et al. |

FOREIGN PATENT DOCUMENTS

| | | |
|---|---|---|
| JP | 2006282807 A | 10/2006 |
| KR | 20050057039 A | 6/2005 |
| KR | 20140049278 A | 4/2014 |
| KR | 20140050956 A | 4/2014 |
| KR | 20150024593 A | 3/2015 |
| WO | WO-2013147989 A1 * | 10/2013 |

OTHER PUBLICATIONS

Search Report from International Application No. PCT/KR2016/012705, dated Feb. 8, 2017.

* cited by examiner

*Primary Examiner* — Irina S Zemel
*Assistant Examiner* — Jeffrey S Lenihan
(74) *Attorney, Agent, or Firm* — Lerner, David, Littenberg, Krumholz & Mentlik, LLP

(57) ABSTRACT

The present invention provides an adhesive composition for optical use, which includes rubber and may be chemically cross-linked through an appropriate curing process, and as a result, may secure excellent long-term durability, water vapor transmission resistance, and chemical resistance, and includes an isobutylene-isoprene rubber having an acrylic acid ester-based functional group in a main chain thereof, a photoinitiator, and a tackifier in order to provide optical characteristics sufficient to be used for optical use. The present invention provides a method for preparing the adhesive composition for optical use, and it is possible to obtain the adhesive composition for optical use, which includes a chemically cross-linkable rubber by the method. Further, the present invention provides an adhesive film for optical use, and excellent long-term durability and optical characteristics may be implemented by applying the adhesive film for optical use to a wide range of electronic devices.

10 Claims, 1 Drawing Sheet

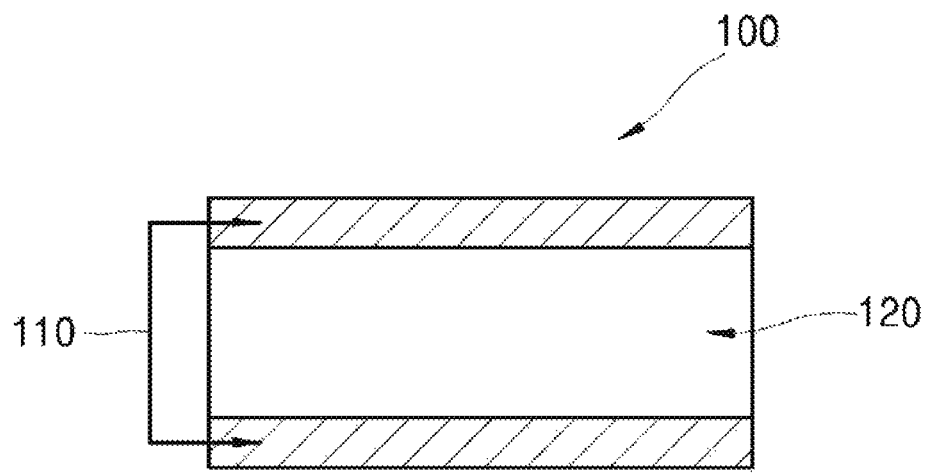

ADHESIVE COMPOSITION FOR OPTICAL USE, METHOD FOR PREPARING ADHESIVE COMPOSITION FOR OPTICAL USE, AND ADHESIVE FILM FOR OPTICAL USE

CROSS-REFERENCE TO RELATED APPLICATIONS

The present application is a national phase entry under 35 U.S.C. § 371 of International Application No. PCT/KR2016/012705 filed on Nov. 4, 2016, published in Korean, which claims priority from Korean Patent Application No. 10-2015-0155168 filed on Nov. 5, 2015, the disclosers of which are incorporated herein by reference.

TECHNICAL FIELD

The present invention relates to an adhesive composition for optical use, and the adhesive composition for optical use enables sulfur- or halogen-free photo cross-linkage and photocuring, implements excellent chemical resistance, water vapor transmission resistance, optical characteristics, and durability due to the ability, and may expand the range of a final product which may be applied. Further, the present invention relates to a method for preparing the adhesive composition for optical use, and an adhesive film for optical use.

BACKGROUND ART

Touch materials including packaged electronic devices or transparent conductive films, and the like need excellent touch sensitivity for excellent operation. Furthermore, a lot of interests have been recently focused on the development of an adhesive composition for improving durability and optical characteristics of a device such as an OLED or a touch screen panel.

In general, an adhesive used in an OLED or a touch screen panel, and the like needs to secure optical characteristics such as transparency and visibility. For this purpose, in the related art, an adhesive including an acrylic resin as a base resin has been generally used, but needs to be complemented in terms of touch sensitivity, and simultaneously, it is an important problem to secure suitable modulus and optical characteristics.

In addition, adhesives using a rubber-based resin also have been developed in order to complement the disadvantages of the acrylic resins, and for example, the official gazette of Korean Patent Application Laid-Open No. 2014-0050956 discloses an adhesive composition including a rubber-based polymer, and the official gazette of Korean Patent Application Laid-Open No. 2014-0049278 also discloses that a butyl rubber-based polymer is used in order to lower a water vapor transmission rate.

However, an adhesive including a rubber-based resin as a base resin has problems in that it is difficult to achieve the chemical cross-linkage through a curing process, and a physical cross-linkage needs to be used, and as a result, it is difficult to form a curing or crosslinking structure for securing sufficient durability. Furthermore, the application of final products may be limited due to the problems.

DETAILED DESCRIPTION OF THE INVENTION

Technical Problem

An exemplary embodiment of the present invention provides an adhesive composition for optical use, which includes rubber and can be chemically cross-linked through an appropriate curing process, and as a result, can secure excellent long-term durability, water vapor transmission resistance, and chemical resistance, and provides optical characteristics sufficient to be used for optical use.

Another exemplary embodiment of the present invention provides a method for preparing an adhesive composition for optical use, and the adhesive composition for optical use, which includes a chemically cross-linkable rubber, may be obtained by the method.

Still another exemplary embodiment of the present invention provides an adhesive film for optical use, and excellent long-term durability and optical characteristics may be implemented by applying the adhesive film for optical use to a wide range of electronic devices.

Technical Solution

An exemplary embodiment of the present invention provides an adhesive composition for optical use, which includes an isobutylene-isoprene rubber having an acrylic acid ester-based functional group in a main chain thereof, a photoinitiator, and a tackifier.

Another exemplary embodiment of the present invention provides a method for preparing the adhesive composition for optical use, the method including: introducing an epoxy group into an isoprene unit of an isobutylene-isoprene rubber; converting the epoxy group into a hydroxy group; and preparing an isobutylene-isoprene rubber having an acrylic acid ester-based functional group in a main chain thereof by reacting the hydroxy group with an isocyanate compound having an acrylic acid ester-based functional group in a main chain thereof.

Still another exemplary embodiment of the present invention provides an adhesive film for optical use, including an adhesive layer including photocured products of the adhesive composition for optical use.

Advantageous Effects

The adhesive composition for optical use has excellent water vapor transmission resistance and chemical resistance, may secure an appropriate curing degree by light irradiation, and may implement excellent long-term durability and optical characteristics.

In addition, it is possible to prepare the adhesive composition for optical use, including a chemically cross-linkable rubber through the method for preparing an adhesive composition for optical use.

Furthermore, it is possible to obtain an advantage in that the adhesive film for optical use may be utilized in various electronic devices compared to an existing adhesive film including an acrylic resin or a rubber-based resin as a base resin.

DESCRIPTION OF DRAWINGS

The Figure schematically illustrates the cross-section of an adhesive film for optical use according to an exemplary embodiment of the present invention.

MODE FOR INVENTION

The benefits and features of the present invention, and the methods of achieving the benefits and features will become apparent with reference to Examples to be described below. However, the present invention is not limited to the Examples to be disclosed below, but may be implemented in various other forms, and the present Examples are only provided for rendering the disclosure of the present invention complete and for fully representing the scope of the invention to a person with ordinary skill in the technical field to which the present invention pertains, and the present invention will be defined only by the scope of the claims. Throughout the specification, like reference numerals indicate like constituent elements.

In the drawings, the thicknesses of layers and regions are exaggerated for clarity. In the drawings, the thicknesses of some layers and regions are exaggerated for convenience of explanation.

Further, in the present specification, when a part such as a layer, a film, a region, and a plate is present "on" or "at an upper portion of" another part, the case includes not only a case where the part is present "immediately on" another part, but also a case where still another part is present therebetween. Conversely, the case where a part is present "immediately on" another part means that no other part is present therebetween. Furthermore, when a part such as a layer, a film, a region, and a plate is present "under" or "at a lower portion of" another part, the case includes not only a case where the part is present "immediately under" another part, but also a case where still another part is present therebetween. Conversely, the case where a part is present "immediately under" another part means that no other part is present therebetween.

In the present specification, 'an isobutylene-isoprene rubber having an acrylic acid ester-based functional group in a main chain thereof' may be simply referred to as 'rubber'.

An exemplary embodiment of the present invention provides an adhesive composition for optical use, which includes an isobutylene-isoprene rubber having an acrylic acid ester-based functional group in a main chain thereof, a photoinitiator, and a tackifier.

The isobutylene-isoprene rubber used in an adhesive in the related art was subjected to physical crosslinking through thermal curing or photocuring based on sulfur, or subjected to crosslinking by substituting the rubber itself with halogen. Alternatively, rubber was contained in an adhesive by a method of mixing a photocurable monomer with an isobutylene-isoprene rubber to cure the photocurable monomer by light irradiation.

In the case where sulfur or halogen components are used in an adhesive, a problem such as corrosion may be caused when the adhesive is applied to a final electronic product, and accordingly, the application range is narrow, and in the case where a photocurable monomer is used, there is a problem in that the durability is not good because the rubber itself does not participate in the curing.

In order to solve the problems, the present invention introduces an acrylic acid ester-based functional group into the isobutylene-isoprene rubber through chemical modification. Since the adhesive composition for optical use need not use sulfur or halogen components for curing by including an isobutylene-isoprene rubber having an acrylic acid ester-based functional group in a main chain thereof, there is no risk of corrosion against an object to be attached, rubber itself may form a cross-linking structure through photocuring, and as a result, it is possible to obtain an advantage in that excellent long-term durability is implemented.

According to an exemplary embodiment of the present invention, the content of an isoprene unit of the isobutylene-isoprene rubber may be 1 mol % or more and 30 mol % or less, based on the total mole number of an isobutylene unit and an isoprene unit. Further, the content of the isoprene unit may be 1% or more and 30% or less, based on the total unit of the isobutylene-isoprene. The content of the isoprene unit may be the same as the content of an isoprene monomer based on the total copolymerization monomers when the isobutylene-isoprene rubber is prepared.

When the content of isoprene is adjusted within the aforementioned range, unsaturated double bonds of the isobutylene-isoprene rubber are sufficient, so that an acrylic acid ester-based functional group may be easily introduced, and rubber itself may be smoothly cross-linked through photocuring.

In the present specification, the isobutylene unit and the isoprene unit may mean an isobutylene repeating unit and an isoprene repeating unit in the isobutylene-isoprene rubber, respectively.

Specifically, the isobutylene-isoprene rubber may be a copolymer formed from a monomer mixture including about 70 mol % to about 99 mol % of isobutylene and about 1 mol % to about 30 mol % of isoprene. In this case, when the content of isobutylene is less than about 70 mol % and the content of isoprene is more than about 30 mol %, the moisture permeability and gas permeability of the adhesive composition for optical use are increased, and as a result, there is a concern in that the corrosion of electronic devices to which the adhesive composition is applied may be caused. In addition, when the content of isobutylene is more than about 99 mol % and the content of isoprene is less than about 1 mol %, it is difficult to introduce an acrylic acid ester-based functional group into the isobutylene-isoprene rubber due to a small amount of unsaturated double bonds, and as a result, there is a concern in that the rubber itself is not sufficiently crosslinked through photocuring.

According to an exemplary embodiment of the present invention, the acrylic acid ester-based functional group may be grafted to the isoprene unit of the isobutylene-isoprene rubber. Specifically, the acrylic acid ester-based functional group may be bonded to the main chain of the isobutylene-isoprene rubber. More specifically, the acrylic acid ester-based functional group may be grafted to the isoprene unit in the main chain of the isobutylene-isoprene rubber. The acrylic acid ester-based functional group may be grafted to an isoprene unit, not an isobutylene unit, to minimize the degree of unsaturation of the rubber, and whereby, the yellowing phenomenon may be prevented, and excellent water vapor transmission resistance and high viscoelasticity characteristics may be secured. Furthermore, the acrylic acid ester-based functional group may be grafted to an isoprene unit to be randomly distributed in the rubber chains, and as a result, it is possible to obtain an advantage in that efficient crosslinking can be achieved and the long-term durability and stable physical properties of a final film can be implemented.

According to an exemplary embodiment of the present invention, the isobutylene-isoprene rubber having the acrylic acid ester-based functional group in the main chain thereof may have a weight average molecular weight (Mw) of about 100,000 to about 1,000,000, for example, about 150,000 to about 800,000. When the rubber has a weight average molecular weight of less than about 100,000, a physical entanglement site after photocuring is insufficient, so that there is a concern in that the durability of a product to which the adhesive composition for optical use is applied may deteriorate, and when the adhesive composition for optical use is coated, there may occur a dewetting problem. Further, when the rubber has a weight average molecular weight of more than about 1,000,000, the viscosity of the adhesive composition for optical use is extremely increased, so that the rubber may be disadvantageous in terms of process conditions and compatibility with other components, and when the adhesive composition for optical use is coated, roughness is increased, so that there may occur a problem in that the uniformity of the coating deteriorates.

The acrylic acid ester-based functional group may be a functional group which may form a cross-linking structure by light irradiation, and simultaneously, is easily introduced into the isobutylene-isoprene rubber. Specifically, according to an exemplary embodiment of the present invention, the acrylic acid ester-based functional group may include one selected from the group consisting of an alkyl (meth)acrylate group, a cycloalkyl (meth)acrylate group, an alkoxyalkyl (meth)acrylate group, and a combination thereof.

Specifically, the alkyl (meth)acrylate group may be a (meth)acrylate group having a straight-chained or branch-chained alkyl group having 1 to 10 carbon atoms, and may include, for example, an ethyl (meth)acrylate group, a propyl (meth)acrylate group, a butyl (meth)acrylate group, a pentyl (meth)acrylate group, or a hexyl (meth)acrylate group.

Further, the cycloalkyl (meth)acrylate group may be a (meth)acrylate group having a cyclic alkyl group having 3 to 20 carbon atoms, and may include, for example, a cyclopentyl (meth)acrylate group or a cyclohexyl (meth)acrylate group.

In addition, the alkoxyalkyl (meth)acrylate group may be a (meth)acrylate group including an alkoxy group (—OR) having a straight-chained, branch-chained or cyclic alkyl group having 1 to 10 carbon atoms or an aromatic group having 6 to 15 carbon atoms, and may include, for example, a methoxy (meth)acrylate group, an ethoxy (meth)acrylate group, a propyloxy (meth)acrylate group, a butoxy (meth)acrylate group, a pentoxy (meth)acrylate group, a benzyloxy (meth)acrylate group, or a phenyloxy (meth)acrylate group.

The adhesive composition for optical use includes rubber, and has an aspect in which it is difficult to secure sufficient peel strength and adhesion strength due to the low water vapor transmission thereof. Accordingly, the adhesive composition for optical use may include a tackifier.

According to an exemplary embodiment of the present invention, the tackifier may include one selected from the group consisting of a hydrogenated dicyclopentadiene-based compound, a hydrogenated terpene-based compound, a hydrogenated rosin-based compound, a hydrogenated aromatic compound, a hydrogenated petroleum-based compound, and a combination thereof. The tackifier includes a compound having a hydrogenated structure and thus may be advantageous in implementing transparency, and excellent adhesion strength and peel strength may be implemented because the tackifier is less affected by the photo energy during the photocuring.

For example, the tackifier may include a hydrogenated dicyclopentadiene-based compound or a hydrogenated rosin-based compound, and in this case, it is possible to obtain an effect in that particularly, the tack performance is imparted and optical characteristics such as light transmittance and haze are improved.

The hydrogenated tackifier may be a partially hydrogenated or completely hydrogenated tackifier. Specifically, the hydrogenated tackifier may have a hydrogenation rate of about 60% or more, for example, 100%. When the hydrogenation rate is less than about 60%, a large amount of double bonds are included in the molecule, and as a result, there is a concern in that the visibility and transparency of an adhesive layer formed of the adhesive composition deteriorate, and as the tendency that the double bonds absorb photo energy is increased, during the irradiation of photo energy for curing, the double bonds absorb the photo energy, and as a result, there may occur a problem in that adhesion properties and peel strength become non-uniform.

In addition, the tackifier may have a softening point of about 80° C. to about 150° C., specifically about 80° C. to about 130° C., and more specifically about 100° C. to about 125° C. The softening point refers to a temperature at which when heated, a material starts to be deformed or softened by heat. When the softening point of the tackifier is less than about 80° C., the tackifier is softened at a relatively low temperature, and accordingly, there may occur a problem in that the high-temperature reliability of an adhesive including the tackifier deteriorates, and when an adhesive film is prepared by using the adhesive, there may occur a problem in that it is difficult to distribute and store the adhesive film at a high temperature, and when the softening point of the tackifier is more than about 150° C., there is a problem in that it is difficult to implement an adhesion promoting effect of an adhesive at normal temperature, and there is a concern in that there may occur a problem in that the adhesive becomes hard even though a small amount of the tackifier is added to the adhesive.

According to an exemplary embodiment of the present invention, the adhesive composition for optical use may include the tackifier in an amount of about 10 to about 70 parts by weight based on 100 parts by weight of the isobutylene-isoprene rubber having the acrylic acid ester-based functional group in the main chain thereof. When the tackifier is included in an amount of less than about 10 parts by weight, there may occur a problem in that the peel strength of the adhesive layer formed of the adhesive composition for optical use deteriorates, and when the tackifier is included in an amount of more than about 70 parts by weight, the glass transition temperature of the adhesive composition for optical use is increased, so that there may occur a problem in that the tack properties deteriorate, and the peel strength also deteriorates.

The adhesive composition for optical use is cured by light irradiation, and may include a photoinitiator. The photoinitiator is a compound which generates radicals by photo energy to initiate cross-linking reactions between the photocurable functional groups.

For example, the photoinitiator may include one selected from the group consisting of benzoin methyl ether, 2,4,6-trimethylbenzoyl diphenylphosphine oxide, bis(2,4,6-trimethylbenzoyl) phenylphosphine oxide, α,α-methoxy-α-hydroxyacetophenone, 2-benzoyl-2-(dimethylamino)-1-[4-(4-morpholinyl) phenyl]-1-butanone, 2,2-dimethoxy-2-phenylacetophenone, 2,2-dimethoxy-1,2-diphenylethan-1-one, 1-hydroxy-cyclohexyl-phenyl ketone, 2-benzyl-2-(dimethylamino)-1-[4-(4-morpholinyl)phenyl]-1-butanone, and a combination thereof, and is not limited thereto.

According to an exemplary embodiment of the present invention, the adhesive composition for optical use may include the photoinitiator in an amount of about 0.1 to about 5 parts by weight based on 100 parts by weight of the isobutylene-isoprene rubber having the acrylic acid ester-based functional group in the main chain thereof. When the photoinitiator is included at a content within the aforementioned range, the rubber may form an appropriate cross-linking structure through a photocuring reaction, and may improve the curing efficiency compared to the preparation costs.

According to an exemplary embodiment of the present invention, the adhesive composition for optical use may not include a separate photocurable monomer for photocuring. Specifically, the adhesive composition for optical use includes the isobutylene-isoprene rubber having the acrylic acid ester-based functional group in the main chain thereof, a photoinitiator, and a tackifier, and since the rubber itself has photocurable characteristics, the adhesive composition for optical use may not include a separate photocurable monomer for photocuring.

As described above, in the case of an adhesive including a rubber-based resin in the related art as a base resin, since a rubber-based resin fails to participate in a photocuring reaction, the adhesive is cured by using a photocurable monomer. However, in this case, the rubber itself does not participate in the curing, and as a result, there is a problem in that the durability is not good, and there is a concern in that the photocurable monomer remaining after the curing causes a yellowing phenomenon, or the water vapor permeability is increased, and as a result, the durability may deteriorate.

In contrast, the adhesive composition for optical use does not include a separate photocurable monomer for photocuring, and it is possible to obtain an advantage in that excellent long-term durability and high viscoelasticity characteristics are secured.

Another exemplary embodiment of the present invention provides a method for preparing an adhesive composition for optical use, the method including: introducing an epoxy group into an isoprene unit of an isobutylene-isoprene rubber; converting the epoxy group into a hydroxy group; and preparing an isobutylene-isoprene rubber having an acrylic acid ester-based functional group in a main chain thereof by reacting the hydroxy group with an isocyanate compound having an acrylic acid ester-based functional group.

By the method for preparing an adhesive composition for optical use, the adhesive composition for optical use may be prepared, and specifically, the isobutylene-isoprene rubber having the acrylic acid ester-based functional group in the main chain thereof may be prepared.

As described above, the acrylic acid ester-based functional group may be grafted to the isoprene unit of the isobutylene-isoprene rubber, and by grafting the acrylic acid ester-based functional group to the isoprene unit of the isobutylene-isoprene rubber, the degree of unsaturation of the rubber may be minimized, and whereby, the yellowing phenomenon may be prevented, and excellent water vapor transmission resistance and high viscoelasticity characteristics may be secured.

Specifically, the method for preparing an adhesive composition for optical use may include introducing an epoxy group into an isoprene unit of an isobutylene-isoprene rubber. In the aforementioned step, an epoxy group may be introduced by a chemical reaction of double bonds, which are present in the isoprene unit of the isobutylene-isoprene rubber, with a compound capable of providing an epoxy group. In this case, the compound which provides the epoxy group may be, for example, a peroxide.

The method for preparing an adhesive composition for optical use may include converting the epoxy group into a hydroxy group. In the aforementioned step, the epoxy group may be converted into a hydroxy group through a hydrolysis.

The method for preparing an adhesive composition for optical use may include finally preparing an isobutylene-isoprene rubber having an acrylic acid ester-based functional group in a main chain thereof by reacting the hydroxy group with an isocyanate compound having an acrylic acid ester-based functional group. In the isocyanate compound having the acrylic acid ester-based functional group, the isocyanate group thereof may form a urethane bond with the hydroxy group, so that the isocyanate compound may serve to introduce the acrylic acid ester-based functional group into the isobutylene-isoprene rubber.

For example, the acrylic acid ester-based functional group is a functional group which may form a cross-linking structure by light irradiation, and is easily introduced into the isobutylene-isoprene rubber, and the matters on the kind thereof are the same as those described above.

The adhesive composition for optical use includes an isobutylene-isoprene rubber having an acrylic acid ester-based functional group in a main chain thereof, the rubber may be prepared by the above-described method, and accordingly, the acrylic acid ester-based functional group may be efficiently grafted to an isoprene unit.

Further, there is an advantage in that a reaction may be performed in one arrangement by preparing the isobutylene-isoprene rubber having the acrylic acid ester-based functional group in the main chain thereof by the preparation method as compared to the case of introducing the acrylic acid ester-based functional group into the rubber by another preparation method, and there is no addition reaction and it is possible to obtain an advantage in an aspect in that a product may be formed by forming an acrylic acid ester-based functional group through the limited modification of double bonds of isobutylene-isoprene without regard to the compatibility with other acrylic monomers.

According to an exemplary embodiment of the present invention, the adhesive composition for optical use may further include mixing a photoinitiator and a tackifier with the isobutylene-isoprene rubber having the acrylic acid ester-based functional group in the main chain thereof. Accordingly, it is possible to prepare an adhesive composition for optical use, including the isobutylene-isoprene rubber having the acrylic acid ester-based functional group in the main chain thereof, a photoinitiator, and a tackifier.

The matters on the photoinitiator and the tackifier are the same as those described above.

Still another exemplary embodiment of the present invention provides an adhesive film for optical use, including an adhesive layer including photocured products of the adhesive composition for optical use. The adhesive film for optical use is applied to displays, electronic devices, and the like, and may exhibit excellent optical characteristics and durability because the adhesive film for optical use has an adhesive layer including photocured products of the adhesive composition for optical use.

The photocured products may be prepared by curing the adhesive composition for optical use by light irradiation, and in this case, an acrylic acid ester-based functional group of a rubber in the adhesive composition for optical use may form a crosslinking structure, and then the adhesive composition for optical use may be cured.

According to an exemplary embodiment of the present invention, the adhesive layer may have a gel content of about 40 wt % to about 100 wt %, and for example, the gel content may be about 60 wt % to about 90 wt %. When the gel content satisfies the aforementioned range, the adhesive layer may implement attaching properties when being applied to displays or electronic devices, thereby contributing to the improvement of durability.

Further, the adhesive layer may have a storage modulus of about 0.15 MPa to about 0.25 MPa measured at a normal temperature of 25° C., for example, about 0.20 MPa to about 0.25 MPa. When the storage modulus of the adhesive layer at normal temperature satisfies the aforementioned range, an excellent step absorbing performance may be exhibited, and a performance of preventing bubbles and a lifting phenomenon may be excellent under high temperature and high humidity environments.

The adhesive layer may have a peel strength against a glass substrate of about 950 g/in or more, for example, about 950 g/in to about 2,500 g/in. Simultaneously, the adhesive layer may have a water vapor transmission rate (WVTR) of 10 g/m²·24 hr or less, for example, about 7 g/m²·24 hr or less, for example, more than about 0 g/m²·24 hr and less than about 7 g/m²·24 hr at a thickness of 50 μm. When the adhesive layer simultaneously satisfies a peel strength within the aforementioned range and a water vapor transmission rate within the aforementioned range, an excellent long-term durability may be imparted to displays or electronic devices to which the adhesive film is applied.

Further, the adhesive layer may have a light transmittance of about 90% or more, and a haze of less than about 2.5%, for example, less than about 2.0% or less than 1%. When the adhesive layer satisfies a light transmittance and a haze within the aforementioned ranges, the adhesive layer may be usefully applied to parts of displays or electronic devices, which require the visibility, and may exhibit excellent visibility.

According to an exemplary embodiment of the present invention, the adhesive film for optical use may include a release film layer stacked on one surface or both surfaces of the adhesive layer.

The Figure schematically illustrates the cross-section of an adhesive film for optical use according to an exemplary embodiment of the present invention.

Referring to the Figure, an adhesive film 100 for optical use includes an adhesive layer 120 including photocured products of the adhesive composition for optical use, and may include a release film layer 110 stacked on one surface or both surfaces of the adhesive layer 120. FIG. 1 illustrates an example of a structure in which the release film layer 110 is disposed on both surfaces of the adhesive layer 120.

The release film layer is a layer which is peeled off and removed when the adhesive film for optical use is applied to a final product, and may be formed on one surface or both surfaces of the adhesive layer depending on a position where the adhesive layer is disposed in a final product.

The release film layer may have a structure in which a release agent is applied on one surface of a substrate film. In this case, the release film layer may be disposed such that a surface to which the release agent is applied is brought into contact with the adhesive layer.

In this case, the substrate film is not particularly limited, but, for example, a polyethylene terephthalate (PET) film may be used in order to favor the distribution and tailoring of the adhesive film for optical use without being impaired by photo energy irradiated for the photocuring of the adhesive composition for optical use.

The release agent is not particularly limited, but it may be advantageous to use a silicone-based product in order to secure an appropriate peel strength with an adhesive layer formed from the adhesive composition for optical use.

Hereinafter, specific examples of the present invention will be suggested. However, the Examples described below are only provided for specifically exemplifying or explaining the present invention, and the present invention is not limited thereby.

PREPARATION EXAMPLE 1

An isobutylene-isoprene rubber being a copolymer formed from a monomer mixture including 1.7 mol % of isoprene and 98.3 mol % of isobutylene was prepared. 3 parts by weight of a peroxide (mCPBA) were put into 100 parts by weight of the isobutylene-isoprene rubber in a 2 L reactor equipped with a cooling apparatus such that a nitrogen gas was refluxed and the temperature was easily adjusted, and then the resulting mixture was stirred at 30° C. for 6 hours. Accordingly, an epoxy group was introduced into an isoprene unit of the isobutylene-isoprene rubber. Subsequently, 3.1 parts by weight of an aqueous hydrochloric acid solution having a concentration of 1 N was put into 100 parts by weight of the rubber, the resulting mixture was stirred at 30° C. for 1 hour, and then the temperature was warmed to 90° C., and the mixture was stirred for 1 hour. Accordingly, an isobutylene-isoprene rubber having a hydroxy group grafted to an isoprene unit of the main chain thereof was prepared.

Subsequently, the prepared rubber was cooled to 70° C., and then 2 parts by weight of 2-isocyanatoethylacrylate (Showa Denko, KarenzAOI) was introduced into 100 parts by weight of the rubber under nitrogen reflux, and then 100 ppm of dibutyltin laurate was added thereto, and then the resulting mixture was stirred for 4 hours to prepare an isobutylene-isoprene rubber (IIR-acrylate) having an ethyl acrylate group grafted to an isoprene unit of the main chain thereof.

PREPARATION EXAMPLE 2

An isobutylene-isoprene rubber (IIR-acrylate) having an ethyl acrylate group grafted to an isoprene unit of the main chain thereof was prepared in the same manner as in Preparation Example 1, except that an isobutylene-isoprene rubber being a copolymer formed from a monomer mixture including 0.5 mol % of isoprene and 99.5 mol % of isobutylene was used.

PREPARATION EXAMPLE 3

An isobutylene-isoprene rubber (IIR-acrylate) having an ethyl acrylate group grafted to an isoprene unit of the main chain thereof was prepared in the same manner as in Preparation Example 1, except that an isobutylene-isoprene rubber being a copolymer formed from a monomer mixture including 28 mol % of isoprene and 72 mol % of isobutylene was used.

PREPARATION EXAMPLE 4

An isobutylene-isoprene rubber (IIR-acrylate) having an ethyl acrylate group grafted to an isoprene unit of the main chain thereof was prepared in the same manner as in Preparation Example 1, except that an isobutylene-isoprene rubber being a copolymer formed from a monomer mixture including 35 mol % of isoprene and 65 mol % of isobutylene was used.

PREPARATION EXAMPLE 5

An isobutylene-isoprene rubber being a copolymer formed from a monomer mixture including 1.7 mol % of isoprene and 98.3 mol % of isobutylene was prepared. 3 parts by weight of a peroxide (mCPBA) were put into 100 parts by weight of the isobutylene-isoprene rubber in a 2 L reactor equipped with a cooling apparatus such that a nitrogen gas was refluxed and the temperature was easily adjusted, and then the resulting mixture was stirred at 30° C. for 6 hours. Accordingly, an epoxy group was introduced into an isoprene unit of the isobutylene-isoprene rubber. Subsequently, 1 part by weight of periodic acid was put into 100 parts by weight of the rubber, the resulting mixture was stirred at 30° C. for 2 hours, and then, 3 parts by weight of sodium borohydride (NaBH$_4$) were introduced thereinto, and the resulting mixture was stirred for 6 hours. Accordingly, an isobutylene-isoprene rubber having a hydroxy group at the side chains (ends) thereof was prepared. Subsequently, 4 parts by weight of 2-isocyanatoethylacrylate (Showa Denko, KarenzAOI) was introduced into 100 parts by weight of the rubber under nitrogen reflux, and then 100 ppm of dibutyltin laurate was added thereto, and then the resulting mixture was stirred for 4 hours to prepare an isobutylene-isoprene rubber (IIR-acrylate) having an ethyl acrylate group at the side chains (ends) thereof.

EXAMPLE 1

An adhesive composition for optical use was prepared by mixing 0.5 part by weight of a photoinitiator (Irgacure 651) and 10 parts by weight of a hydrogenated dicyclopentadiene-based tackifier (D-100, manufactured by DRT) based on 100 parts by weight of the isobutylene-isoprene rubber having the ethyl acrylate group grafted to the isoprene unit of the main chain thereof according to Preparation Example 1.

EXAMPLE 2

An adhesive composition for optical use was prepared in the same manner as in Example 1, except that 20 parts by weight of the hydrogenated dicyclopentadiene-based tackifier (D-100, manufactured by DRT) was mixed based on 100 parts by weight of the isobutylene-isoprene rubber (IIR-acrylate) having the ethyl acrylate group grafted to the isoprene unit of the main chain thereof according to Preparation Example 1.

EXAMPLE 3

An adhesive composition for optical use was prepared in the same manner as in Example 1, except that 30 parts by weight of the hydrogenated dicyclopentadiene-based tackifier (D-100, manufactured by DRT) was mixed based on 100 parts by weight of the isobutylene-isoprene rubber (IIR-acrylate) having the ethyl acrylate group grafted to the isoprene unit of the main chain thereof according to Preparation Example 1.

EXAMPLE 4

An adhesive composition for optical use was prepared in the same manner as in Example 1, except that 10 parts by weight of the hydrogenated dicyclopentadiene-based tackifier (D-100, manufactured by DRT) was mixed based on 100 parts by weight of the isobutylene-isoprene rubber (IIR-acrylate) having the ethyl acrylate group grafted to the isoprene unit of the main chain thereof according to Preparation Example 3.

REFERENCE EXAMPLE 1

An adhesive composition for optical use was prepared by mixing 0.5 part by weight of a photoinitiator (Igacure 651) and 10 parts by weight of a hydrogenated dicyclopentadiene-based tackifier (D-100, manufactured by DRT) based on 100 parts by weight of the isobutylene-isoprene rubber (IIR) having the acrylic acid ester-based functional group grafted to the isoprene unit of the main chain thereof according to Preparation Example 2.

REFERENCE EXAMPLE 2

An adhesive composition for optical use was prepared by mixing 0.5 part by weight of a photoinitiator (Irgacure 651) and 10 parts by weight of a hydrogenated dicyclopentadiene-based tackifier (D-100, manufactured by DRT) based on 100 parts by weight of the isobutylene-isoprene rubber having the acrylic acid ester-based functional group grafted to the isoprene unit of the main chain thereof according to Preparation Example 4.

REFERENCE EXAMPLE 3

An adhesive composition for optical use was prepared by mixing 0.5 part by weight of a photoinitiator (Irgacure 651) and 10 parts by weight of a hydrogenated dicyclopentadiene-based tackifier (D-100, manufactured by DRT) based on 100 parts by weight of the isobutylene rubber having the acrylic acid ester-based functional group at the side chains thereof to Preparation Example 5.

COMPARATIVE EXAMPLE 1

An adhesive composition for optical use was prepared by mixing 0.5 part by weight of a photoinitiator (Irgacure 651) and 10 parts by weight of a hydrogenated dicyclopentadiene-based tackifier (D-100, manufactured by DRT) based on 100 parts by weight of the isobutylene-isoprene rubber (IIR) which has no acrylic acid ester-based functional group and is composed of 1.7 mol % of an isoprene and 98.3 mol % of isobutylene.

COMPARATIVE EXAMPLE 2

An adhesive composition for optical use was prepared by mixing 10 parts by weight of dicyclopentadiene diacrylate as a separate photocurable monomer for photocuring, 0.5 part by weight of a photoinitiator (Irgacure 651), and 10 parts by weight of a hydrogenated dicyclopentadiene-based tackifier (D-100, manufactured by DRT) based on 100 parts by weight of the isobutylene-isoprene rubber (IIR) which has no acrylic acid ester-based functional group and is composed of 1.7 mol % of an isoprene and 98.3 mol % of isobutylene.

COMPARATIVE EXAMPLE 3

An adhesive composition for optical use was prepared by mixing 0.5 part by weight of a photoinitiator (Irgacure 651) and 20 parts by weight of a hydrogenated dicyclopentadiene-based tackifier (D-100, manufactured by DRT), based on 100 parts by weight of an acrylic resin.

The compositions of the Examples, the Reference Examples, and the Comparative Examples are shown in the following Table 1.

TABLE 1

| | Base resin | Photocurable monomer | Photoinitiator | Tackifier |
|---|---|---|---|---|
| Example 1 | IIR-acrylate To 100 (Preparation Example 1) | — | Irgacure 651 0.5 | Dicyclopentadiene-based 10 |
| Example 2 | IIR-acrylate To 100 (Preparation Example 1) | — | Irgacure 651 0.5 | Dicyclopentadiene-based 20 |
| Example 3 | IIR-acrylate To 100 (Preparation Example 1) | — | Irgacure 651 0.5 | Dicyclopentadiene-based 30 |
| Example 4 | IIR-acrylate To 100 (Preparation Example 3) | — | Irgacure 651 0.5 | Dicyclopentadiene-based 10 |
| Reference Example 1 | IIR-acrylate To 100 (Preparation Example 2) | — | Irgacure 651 0.5 | Dicyclopentadiene-based 10 |
| Reference Example 2 | IIR-acrylate To 100 (Preparation Example 4) | — | Irgacure 651 0.5 | Dicyclopentadiene-based 10 |
| Reference Example 3 | IIR-acrylate To 100 (Preparation Example 5) | — | Irgacure 651 0.5 | Dicyclopentadiene-based 10 |
| Comparative Example 1 | IIR To 100 | — | Irgacure 651 0.5 | Dicyclopentadiene-based 10 |
| Comparative Example 2 | IIR To 100 | Dicyclopentadiene diacrylate 10 | Irgacure 651 0.5 | Dicyclopentadiene-based 10 |
| Comparative Example 3 | Acrylic resin To 100 | — | Irgacure 651 0.5 | Dicyclopentadiene-based 20 |

<Evaluation>

Photocured products were formed by irradiating a UV photo energy of 2,000 mJ/cm$^2$ onto each of the adhesive compositions for optical use according to the Examples, the Reference Examples, and the Comparative Examples, and physical properties of adhesive layers having a thickness of 50 μm and including the photocured products were evaluated by the following method.

EXPERIMENTAL EXAMPLE 1

Measurement of Gel Content

The initial weights (Wi) of samples obtained by cutting each of the adhesive layers into a predetermined size were measured. Subsequently, the samples were immersed in a toluene solvent and left to stand for 24 hours, and subsequently, the samples were filtered by using a filtration apparatus, and then the weights (Wf) were measured. Subsequently, the gel contents were derived by the following Equation 1, and the results are shown in the following Table 2.

Gel content (%)={1−(Wi−Wf)/Wi}×100    [Equation 1]

EXPERIMENTAL EXAMPLE 2

Measurement of Storage Modulus

The storage modulus of the adhesive layer was measured by using a measurement device (ARES G2) under conditions of 25° C., and the results are shown in the following Table 2.

EXPERIMENTAL EXAMPLE 3

Measurement of Water Vapor Transmission Rate

For each of the adhesive layers, a water vapor transmission rate (WVTR) was measured by adding a predetermined amount of water to a cup under conditions of a temperature of 38° C. and a relative humidity of 90%, loading the adhesive layer thereon, capping the cup, and then measuring the WVTR by means of Labthink TSY-T3 using a weight loss of water evaporated for 24 hours.

EXPERIMENTAL EXAMPLE 4

Measurement of Peel Strength

The adhesive layer was cut into a width of 1 inch and attached to the surface of a glass substrate being an object to be attached by reciprocating a 2 kg roller thereon 5 times, and after 30 minutes, the peel strength was measured at a peel rate of 300 mm/min by using a universal testing machine (UTM).

EXPERIMENTAL EXAMPLE 5

Measurement of Optical Characteristics

1) Measurement of Light Transmittance

The adhesive layer was attached to a transparent glass substrate, and then light transmittance was measured by using a UV-Vis spectrometer under a normal temperature condition of 20° C. to 30° C.

2) Measurement of Haze

The adhesive layer was attached to a transparent glass substrate, and then a haze was measured by using a haze meter device (manufactured by BYK Co., Ltd.) under a normal temperature condition of 20° C. to 30° C.

EXPERIMENTAL EXAMPLE 6

Measurement of Durability

A glass substrate was attached to one surface of each of the adhesive layers in the Examples, the Reference Examples, and the Comparative Examples, a release film was removed from the other surface and was replaced with an ITO film, and then the resulting glass substrate was left to stand under conditions of a temperature of 85° C. and a relative humidity of 85% for 24 hours to 120 hours. Subsequently, bubbles and a lifting phenomenon were observed by the unaided eye to measure the durability. The measurement results are shown in the following Table 2, and specifically, the case where no bubbles nor lifting phenomenon were generated was marked with o, and the case where bubbles and a lifting phenomenon were generated was marked with x.

TABLE 2

| | Base resin | Gel content (%) | Storage modulus (MPa) | Water vapor transmission rate (g/m² · 24 hr) | Peel strength (g/in) | Durability | Optical characteristics | |
|---|---|---|---|---|---|---|---|---|
| | | | | | | | Light transmittance (%) | Haze (%) |
| Example 1 | IIR-acrylate To 100 (Preparation Example 1) | 73 | 0.20 | 4.8 | 986 | o | 92.4 | 0.85 |
| Example 2 | IIR-acrylate To 100 (Preparation Example 1) | 61 | 0.20 | 5.0 | 1489 | o | 92.9 | 0.66 |
| Example 3 | IIR-acrylate To 100 (Preparation Example 1) | 42 | 0.20 | 5.4 | 2332 | o | 93.0 | 0.56 |
| Example 4 | IIR-acrylate To 100 (Preparation Example 3) | 75 | 0.19 | 6.2 | 1102 | o | 92.1 | 0.88 |
| Reference Example 1 | IIR-acrylate To 100 (Preparation Example 2) | 15 | 0.18 | 4.7 | 850 | x | 92.9 | 0.20 |
| Reference Example 2 | IIR-acrylate To 100 (Preparation Example 4) | 77 | 0.23 | 15.1 | 966 | x | 92.0 | 0.92 |
| Reference Example 3 | IIR-acrylate To 100 (Preparation Example 5) | 25 | 0.10 | 8.2 | 810 | x | 90.3 | 1.24 |
| Comparative Example 1 | IIR To 100 | 0 | 0.18 | 5.2 | 180 | x | 92.9 | 0.20 |
| Comparative Example 2 | IIR To 100 | 61 | 0.23 | 7.8 | 700 | x | 92.8 | 0.40 |
| Comparative Example 3 | Acrylic resin To 100 | 89 | 0.09 | 180 | 1800 | o | 92.8 | 0.18 |

Referring to the results of Tables 1 and 2, it can be confirmed that Comparative Example 1 did not use a separate photocurable monomer for curing while using an isobutylene-isoprene rubber (IIR) incapable of being photocured in itself, and had a gel content of 0% and a very low peel strength because the resulting rubber could not be cured.

Further, it can be seen that Comparative Example 2 relates to an adhesive layer prepared by using an isobutylene-isoprene rubber (IIR) incapable of being photocured in itself and a separate photocurable monomer, and had a higher peel strength than that of Comparative Example 1 but a lower peel strength than those of Examples 1 and 2.

It can be seen that Comparative Example 3 was an adhesive layer by using a typical acrylic resin, and the high peel strength was high, but the water vapor transmission rate was not significantly good. Furthermore, it can be seen that Comparative Example 3 exhibited a lower storage modulus at normal temperature than those in Examples 1 and 2, and from the result, it can be seen that the performances of preventing bubbles and a lifting phenomenon and the step absorbing performances in Examples 1 and 2 were better than those in Comparative Example 3.

Reference Example 1 is an example of using the isobutylene-isoprene rubber in which the content of the isoprene unit was 0.5 mol % based on the total mole number of the isobutylene unit and the isoprene unit, and showed a result in that the peel strength and the durability were inferior to those in Examples 1 to 4.

Reference Example 2 is an example of using the isobutylene-isoprene rubber in which the content of the isoprene unit was 35 mol % based on the total mole number of the isobutylene unit and the isoprene unit, and showed a result in that the water vapor transmission rate, the peel strength, and the durability were inferior to those in Examples 1 to 4.

Reference Example 3 is an example of using an isobutylene-isoprene rubber in which an acrylic acid ester-based functional group was bonded to the side chains thereof, and showed a result in that the water vapor transmission rate, the peel strength, and the durability were inferior to those in Examples 1 to 4.

As reviewed above, the adhesive layer according to an exemplary embodiment of the present invention may secure a high peel strength and excellent water vapor transmission resistance, and as a result, it is possible to impart excellent durability to an optical device to which the adhesive layer according to an exemplary embodiment of the present invention is applied.

EXPLANATION OF REFERENCE NUMERALS AND SYMBOLS

100: Adhesive film
110: Release film layer
120: Adhesive layer

The invention claimed is:

1. An adhesive composition for optical use, comprising:
an isobutylene-isoprene rubber having an acrylic acid ester-based functional group in a main chain thereof;
a photoinitiator; and
a tackifier,
wherein the acrylic acid ester-based functional group is grafted to an isoprene unit of the isobutylene-isoprene rubber through a urethane bond.

2. The adhesive composition of claim 1, wherein a content of the isoprene unit of the isobutylene-isoprene rubber is 1 mol % or more and 30 mol % or less based on a total mole number of an isobutylene unit and the isoprene unit.

3. The adhesive composition of claim 1, wherein the isobutylene-isoprene rubber having the acrylic acid ester-based functional group in the main chain thereof has a weight average molecular weight (Mw) of 100,000 to 1,000,000.

4. The adhesive composition of claim 1, wherein the acrylic acid ester-based functional group comprises one selected from a group consisting of an alkyl (meth)acrylate group, a cycloalkyl (meth)acrylate group, an alkoxyalkyl (meth)acrylate group, and a combination thereof.

5. The adhesive composition of claim 1, wherein the tackifier comprises one selected from a group consisting of a hydrogenated dicyclopentadiene-based compound, a hydrogenated terpene-based compound, a hydrogenated rosin-based compound, a hydrogenated aromatic compound, a hydrogenated petroleum-based compound, and a combination thereof.

6. The adhesive composition of claim 1, wherein the tackifier is comprised in an amount of 10 to 70 parts by weight based on 100 parts by weight of the isobutylene-isoprene rubber having the acrylic acid ester-based functional group in the main chain thereof.

7. The adhesive composition of claim 1, wherein the adhesive composition for optical use does not comprise a separate photocurable monomer for photocuring.

8. An adhesive film for optical use, comprising an adhesive layer comprising photocured products of the adhesive composition for optical use according to claim 1.

9. The adhesive film of claim 8, wherein a gel content of the adhesive layer is 40 wt % to 100 wt %.

10. The adhesive film of claim 8, wherein the adhesive film for optical use comprises a release film layer stacked on one surface or both surfaces of the adhesive layer.

* * * * *